(12) United States Patent
Wuidart et al.

(10) Patent No.: US 6,222,325 B1
(45) Date of Patent: Apr. 24, 2001

(54) FLUORESCENT LAMP CONTROL CIRCUIT (75) Inventors: Luc Wuidart, Pourrieres; Michel Bardouillet, Rousset, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/193,386

(22) Filed: Nov. 17, 1998

(30) Foreign Application Priority Data

Nov. 21, 1997 (FR) .................................................. 97 14869
Jan. 29, 1998 (FR) .................................................. 98 01246

(51) Int. Cl.[7] .................................................. H05B 37/02
(52) U.S. Cl. ..................... 315/209 R; 315/219; 315/276; 315/DIG. 5
(58) Field of Search ..................................... 315/219, 220, 315/223, 221, 209 R, 224, 274, 276, 279, 297, 291, DIG. 4, DIG. 7, 213, 307

(56) References Cited

U.S. PATENT DOCUMENTS

| | | | |
|---|---|---|---|
| 3,906,302 | 9/1975 | Wiisboom | 315/209 |
| 4,238,710 | * 12/1980 | Nelson | 315/307 |
| 4,358,711 | 11/1982 | Bex | 315/208 |
| 4,472,661 | * 9/1984 | Culver | 315/276 |
| 4,894,587 | * 1/1990 | Jungreis | 315/200 R |
| 4,912,374 | * 3/1990 | Nagase et al. | 315/244 |
| 4,958,109 | * 9/1990 | Naum | 315/307 |
| 4,970,437 | 11/1990 | Stevens | 315/209 R |
| 5,359,274 | * 10/1994 | Bandel | 323/207 |
| 5,459,373 | * 10/1995 | Ham | 315/150 |
| 5,500,575 | 3/1996 | Ionescu | 315/307 |
| 5,714,847 | 2/1998 | Lindauer et al. | 315/307 |
| 5,798,616 | * 8/1998 | Takehara et al. | 315/247 |
| 5,932,976 | 8/1999 | Maheshwari et al. | 315/291 |
| 5,969,484 | * 10/1999 | Santi et al. | 315/247 |
| 6,051,936 | * 4/2000 | Qian | 315/224 |

FOREIGN PATENT DOCUMENTS

| | | | |
|---|---|---|---|
| 42 00 900 | 9/1992 | (DE) | H05B/41/34 |
| 2 067 318 | 7/1981 | (GB) | G05F/1/66 |

\* cited by examiner

Primary Examiner—Don Wong
Assistant Examiner—Tuyet T. Vo
(74) Attorney, Agent, or Firm—Wolf, Greenfield & Sacks, P.C.; James H. Morris; Theodore E. Galanthay (57) ABSTRACT

The present invention relates to a circuit for controlling a fluorescent lamp, including circuitry that provides a low frequency alternating current to the fluorescent lamp, this circuitry being controlled by a controllable switched-mode current source operating at high frequency.

15 Claims, 6 Drawing Sheets

FLUORESCENT LAMP CONTROL CIRCUIT

BACKGROUND OF THE INVENTION

1. Field of the Invention

The present invention relates to the field of fluorescent lamps supplied from the high voltage a.c. mains power system (for example, 220 volts/50 Hz or 115 volts/60 Hz). The present invention more specifically relates to the lamp control, essentially, in current limitation in nominal operation and in turn-on triggering.

2. Discussion of the Related Art

In nominal operation, it is necessary to provide in the lamp supply circuit a current limiting element due to the structure of fluorescent lamps. Indeed, this type of lamp behaves, in nominal operation, as a voltage limiting component, that is, the voltage across the lamp is independent from the supply voltage, and is determined by the power of the lamp itself. Accordingly, to supply a fluorescent lamp on the mains voltage, it is necessary to provide a current limiting component, generally called a "ballast".

At turn-on, it is necessary to provide a triggering or starting component, generally called a "starter", meant to, first, heat up the filaments of the lamp, then start the lamp with an overvoltage.

Figure 1:
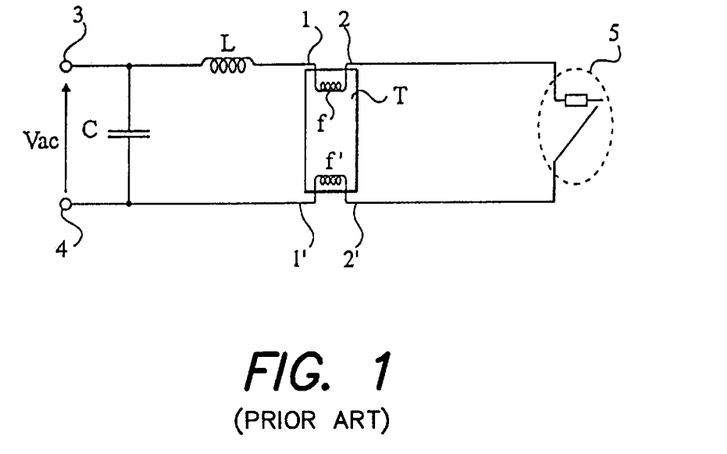
FIGS. 1 and 2, previously described, are meant to show the state of the art and the problem to solve.

FIG. 1 shows an example of a diagram of a conventional fluorescent lamp power supply circuit. A lamp 1 is generally formed of a tubular piece T filled with gas and at both ends of which are provided two excitation filaments f, f'. Each filament is meant to be electrically connected by both its ends and is thus associated with two supply terminals 1, 2, respectively, 1', 2'. The two filaments f, f' are meant to be supplied by an a.c. voltage Vac, for example, the mains voltage applied between two supply terminals 3, 4, of the lamp circuit.

In the example shown in FIG. 1, the current limiting component is formed of a high value iron inductance L interposed between a first a.c. supply terminal 3 and a first terminal 1 of one of the filaments f of lamp T. The second terminal of filament f is connected, via a starting component 5, to a terminal 2' of the second filament f', the second terminal 1' of which is connected to the second mains supply terminal 4. A capacitor C interconnects terminals 3 and 4.

Triggering or starting element 5 is most often a thermal switch meant to heat up filaments f and f', of lamp T by short-circuiting terminals 2 and 2' as long as the filaments are cold. The thermal switch opens as soon as it has reached a given temperature, which causes an overvoltage which triggers the lamp by means of the power storage formed by inductance L.

The function of inductance L is, in nominal operation, to limit the current in lamp T so that its voltage does not exceed the value for which it is designed. The function of capacitor C is to compensate the dephasing associated with the inductive assembly in order to improve the power factor and to make it acceptable for a connection to the network.

A disadvantage of a conventional supply system such as shown in FIG. 1 is that the use of a high inductance (generally on the order of 1 Henry) results in a bulky and heavy system. Further, the inductive nature of the assembly which requires a compensation of the dephasing by capacitor C requires a capacitor of high value (generally of more than 10 μF), which thus has to be an electrolytic capacitor.

Another disadvantage of such a system is that there exists no light dimmer for use with this system.

Figure 2:
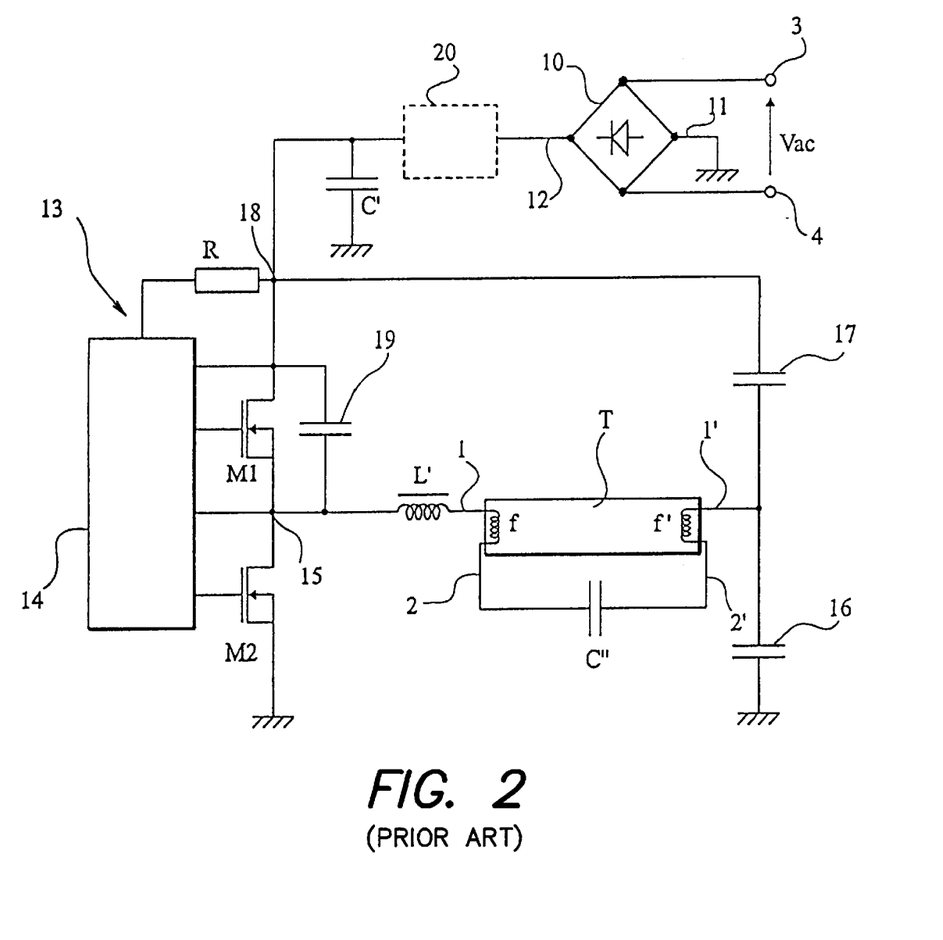

FIG. 2 shows an example of a conventional diagram of a so-called "electronic" limiting circuit, that is, a circuit using active components to limit the current of the fluorescent lamp in nominal operation.

Such a circuit is formed by a diode bridge 10, having two terminals that receive an a.c. voltage connected to two terminals 3, 4, that receive mains voltage Vac. A first rectifying output terminal 11 of bridge 10 forms a ground terminal of the circuit. A second rectifying output terminal 12 of bridge 10 provides, by means of a high value electrolytic capacitor C', a d.c. supply to a switched-mode converter 13 used to supply fluorescent lamp T. Switched-mode converter 13 generally is formed by a control circuit 14 associated with two MOS power transistors M1, M2 (or two bipolar transistors) connected in series between terminal 12 of bridge 10 and the ground, capacitor C' being connected in parallel to this series association. A terminal 15 of the switched-mode converter is connected to a first terminal of a high frequency inductance L' mounted, as in the case of FIG. 1, in series with one of the filaments f of lamp T. A capacitor C" of low value interconnects filaments f and f' and contributes to the lamp triggering. The second terminal 1' of filament f' is grounded via a capacitor 16. Another capacitor 17 connects terminal 1' to an input terminal 18 of switched-mode capacitor 13. Capacitors 16 and 17 are used to filter the d.c. component in lamp T. Terminal 18 receives the d.c. voltage provided by capacitor C'. Transistor M1 is connected between terminal 18 and terminal 15 and transistor M2 is connected between terminal 15 and the ground. Transistors M1 and M2 are controlled by circuit 14 which also includes a feedback input connected to terminal 15 and which is supplied from terminal 18 via a resistor R. A capacitor 19 interconnects terminals 15 and 18 and contributes to the generation of an auxiliary power supply necessary for the control of transistor M1.

Circuit 14 may include other configuration and parametering terminals, not shown. The operation of an electronic limiting circuit such as shown in FIG. 2 is perfectly well known. Bridge 10 and capacitor C' provide, for a 220-volt a.c. voltage, a power supply on the order of 300 d.c. volts to the switched-mode converter which is of "symmetrical half-bridge" type. This converter provides an alternating current at a frequency which is generally approximately 30 kHz to fluorescent lamp T via the high frequency (series) inductance L', which may be of low value (on the order of one mH).

A system such as shown in FIG. 2 eliminates the use of a high inductance (L, FIG. 1).

However, a disadvantage of a circuit such as shown in FIG. 2 is that it still requires an electrolytic capacitor C' of high value (generally higher than 10 μF) to filter the voltage rectified by bridge 10. The use of electrolytic capacitors may result in a reduced circuit lifetime.

Another disadvantage of the system shown in FIG. 2 is that it requires two high voltage MOS power transistors which operate at high frequency.

Another disadvantage of such a system is that it is required to add to bridge 10 a power factor correction circuit 20. Without circuit 20, the harmonics of the supply current strongly adversely affect the power factor.

SUMMARY OF THE INVENTION

The present invention aims at overcoming the disadvantages of known fluorescent lamp supply systems.

The present invention aims, in particular, at providing a novel system for controlling a fluorescent lamp which limits the nominal current while being of low bulk and at least partially integrable.

The present invention also aims at providing a solution which allows addition of a light dimming function to the control system.

The present invention also aims at improving the reliability of the control system by avoiding the use of electrolytic capacitors.

A characteristic of the present invention is to provide a supply of the fluorescent lamp by a sine current at a low frequency corresponding to the mains frequency (for example, 50 hertz) while avoiding the use of a high value inductance by means of an active circuit operating at a higher frequency (for example, on the order of 100 kHz).

Thus, according to the present invention, an active device is used to supply the fluorescent lamp while controlling its current. This device provides a low frequency a.c. current to the fluorescent lamp of a shape similar to that of a ferromagnetic-type limiting circuit, that is, using a single inductance of high value.

More specifically, the present invention provides a circuit for controlling a fluorescent lamp, including means for providing a low frequency alternating current to the fluorescent lamp, these means being controlled by a controllable switched-mode current source operating at high frequency.

According to an embodiment of the present invention, the switched-mode current source is formed by a switch connected in series with a measurement resistor between two rectifying output terminals of a bridge for rectifying a low frequency a.c. supply voltage, the switch being controlled by a circuit based on a measurement of the current in the resistor.

According to an embodiment of the present invention, the switched-mode current source is supplied between the two rectifying output terminals of the bridge.

According to an embodiment of the present invention, the lamp is connected between a first terminal of the low frequency a.c. power supply and a first a.c. input terminal of the bridge, the other a.c. input terminal of which is connected to a second terminal of the a.c. power supply.

According to an embodiment of the present invention, a capacitor having a low value is connected in parallel with a series connection of an inductance having a low value and the lamp.

According to an embodiment of the present invention, an inductive element is connected in series with the switch between the rectifying output terminals of the bridge.

According to an embodiment of the present invention, the bridge comprises, between its first a.c. input terminal and each of the rectifying output terminals, an inductive element.

According to an embodiment of the present invention, the bridge comprises a first inductive element in series with a first diode of the bridge between the second terminal of the a.c. power supply and a first rectifying output terminal, and a second inductive element in series with a second diode between the first a.c. input terminal and the first rectifying output terminal.

According to an embodiment of the present invention, the control circuit includes means for recovering the power of the inductive element(s) when the switch is open.

According to an embodiment of the present invention, said means include an inverter controlled at the frequency of the a.c. supply voltage and likely to operate an inductive element in free wheel mode during the opening periods of the switch.

According to an embodiment of the present invention, the first inductive elements form respective primary windings of two transformers for isolating the lamp with respect to the a.c. supply voltage.

According to an embodiment of the present invention, each transformer includes a first secondary winding for heating a filament of the lamp.

According to an embodiment of the present invention, each transformer further includes a second secondary winding for starting the lamp by forming, with a capacitor connected between first terminals of the filaments, a charge pump circuit.

According to an embodiment of the present invention, each transformer includes a third secondary winding for supplying the lamp once started.

According to an embodiment of the present invention, the control circuit includes means for varying the light intensity of the fluorescent lamp.

The foregoing objects, features and advantages of the present invention will be discussed in detail in the following non-limiting description of specific embodiments in connection with the accompanying drawings.

DETAILED DESCRIPTION

The same elements have been designated with the same references in the different drawings. For clarity, only those elements of the supply circuit which are necessary to the understanding of the present invention have been shown in the drawings and will be described hereafter.

Figure 3:
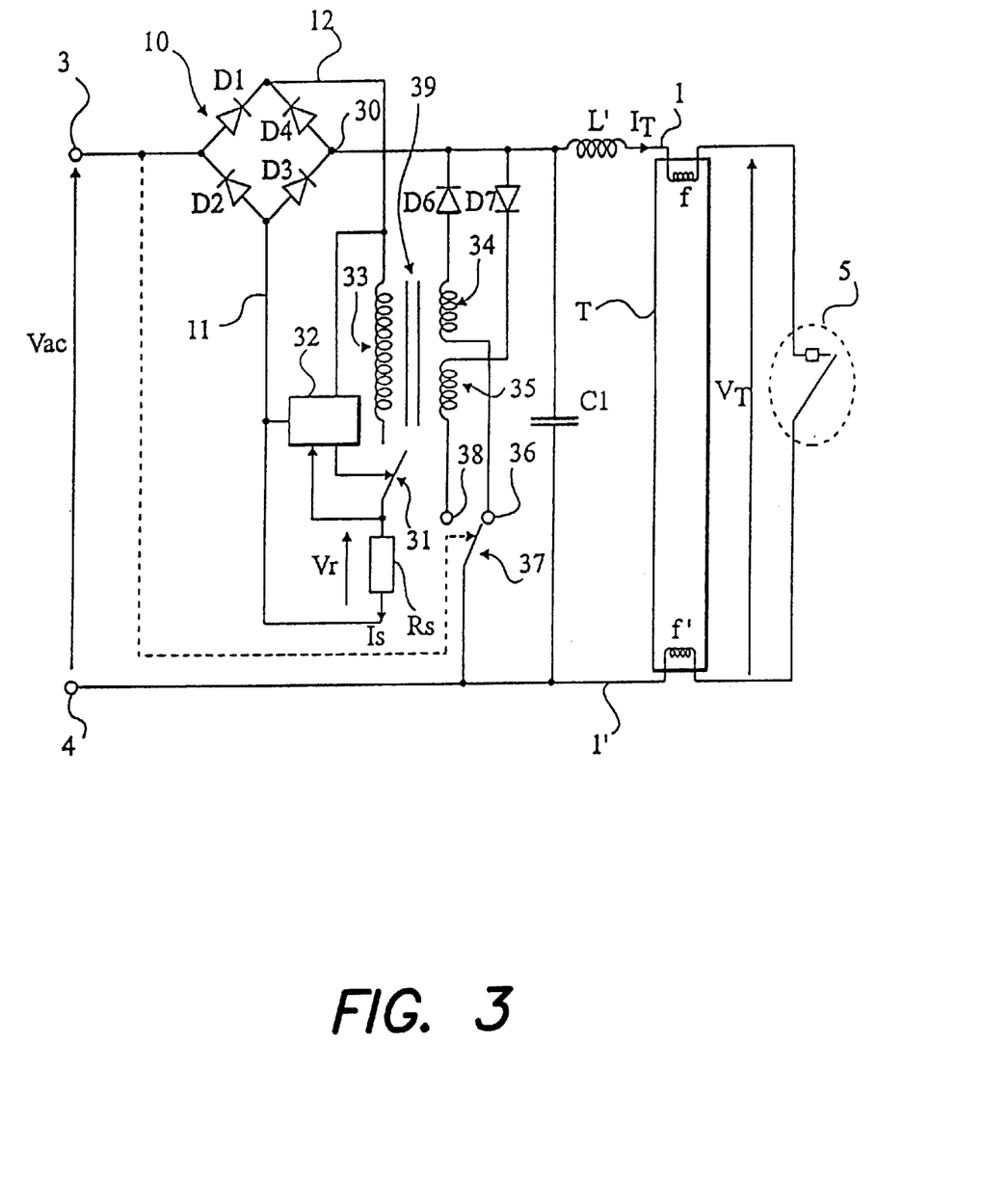
FIG. 3 shows a first embodiment of a fluorescent lamp control circuit according to the present invention.

FIG. 3 shows a first embodiment of a circuit that supplies a fluorescent lamp T according to the present invention.

Such a circuit is formed of a bridge 10 of diodes D1, D2, D3, D4, providing on two output terminals 12, 11, a rectified a.c. voltage. A first a.c. supply terminal of the bridge is connected to a first terminal 3 that receives an a.c. supply voltage, for example, mains voltage Vac. According to the embodiment of FIG. 3, a second a.c. supply terminal 30 of bridge 10 is connected to a second terminal 4 of the mains power supply, at least via lamp T.

Thus, a characteristic of the present invention according to this embodiment, which fundamentally distinguishes it from a conventional control circuit such as shown in FIG. 2, is that lamp T is connected to a.c. voltage terminals of the bridge and not to rectified voltage terminals.

According to the present invention, the current limitation in the lamp is performed by a switched-mode current source associated with a current measurement resistor Rs. This current source is essentially formed of a switch 31 (for example, a MOS transistor, a bipolar transistor, etc.) connected in series with resistor Rs between rectifying output terminals 12 and 11 of bridge 10. Switch 31 is controlled by an electronic circuit 32 based on voltage Vr measured across resistor Rs. Circuit 32 is supplied between terminals 12 and 11. In the embodiment shown in FIG. 3, an inductive element 33, here, the primary winding of a transformer 39, is interposed in series between terminal 12 and switch 31.

An inductance L' is interposed in series between terminal 30 and the first filament f of lamp T. According to the present invention, this inductance L' is of low value (for example, on the order of 1 to 10 mH) since its function is not, conversely to a circuit such as shown in FIG. 1, to limit the current in lamp T, but to curb the current peak associated with the presence of a capacitor C1 between terminals 30 and 4.

During a positive halfwave of supply voltage Vac and while switch 31 is closed, a current flows through diode D1, winding 33 of transformer 39, resistor Rs, and diode D3, and thus charges capacitor C1. When this current reaches a reference value, known by circuit 32 and measured by proportion of voltage Vr, switch 31 opens and, in a simplified embodiment (not shown), capacitor C1 discharges.

In the embodiment shown in FIG. 3, winding 33 of the transformer is used to store power and to slow down the current slope in resistor Rs at each closing of switch 31. Upon opening of switch 31, one of secondary windings 34, 35, is used to recover the reactive power to limit the power dissipation. In this case, upon opening of switch 31, the energy stored in winding 33 is transferred to capacitor C1 by one of secondary windings 34, 35, of the transformer, according to the considered halfwave.

A first secondary winding 34 is connected in series with a diode D6 between terminal 30 and a first terminal 36 of an inverter 37 having its second terminal 38 connected in series with a second secondary winding 35 and a diode D7 to the same terminal 30. The common node of inverter 37 is connected to terminal 4 and diodes D6 and D7 are connected reversely with respect to each other. Inverter 37 is controlled at the frequency of a.c. voltage Vac and alternately switches from a position where it connects terminal 30 to terminal 4 via diode D7 and winding 35 and a position where it connects terminal 4 to terminal 30 via winding 34 and diode D6.

Assuming that inverter 37 is closed on contact 36 during a positive halfwave, the power stored in winding 33 before opening of switch 31 is transferred to capacitor C1 by winding 34 through diode D6.

Similarly, if inverter 37 is closed on contact 38 during the negative halfwave, a current flows in diode D2, resistor Rs, switch 31, winding 33, and diode D4 during closing periods of switch 31 and the power stored in winding 33 is transferred, upon opening of switch 31, by winding 35 through diode D7.

The value to which the current in lamp T is limited by means of a system according to the present invention is set by the opening threshold of switch 31 by means of control circuit 32. It should be noted that circuit 32 is designed so that the frequency of the closing cycles of switch 31 is much higher than the frequency of the a.c. power supply. For example, circuit 32 is designed so that switch 31 is closed at a 100-kHz frequency, its opening being triggered at each switched-mode period, by measurement of the current flowing through resistor Rs.

Thus, capacitor C1 can be of low value (for example, on the order of one hundred nanofarads). In the embodiment described hereabove, fluorescent lamp T is associated with a conventional starter 5.

The system described hereabove generates a low frequency a.c. current which is adapted to supplying a fluorescent lamp. Inductance L' smooths the residual high frequency component of the current supplied to the lamp. The latter can thus be of low size/value. It should be noted that inductance L' also intervenes upon the operation of starter 5.

It should be noted that the two secondary windings 34 and 35 of transformer 39 must be of the same size and must be adapted to the nominal voltage of the fluorescent lamp. However, it is not required that the size of secondary windings 34 and 35 corresponds to half the size of primary winding 33. For example, considering a primary winding of 220 spirals and a lamp designed to have a nominal operation at 90 volts, secondary windings 34 and 35 include on the order of 90 spirals each.

Figure 4:
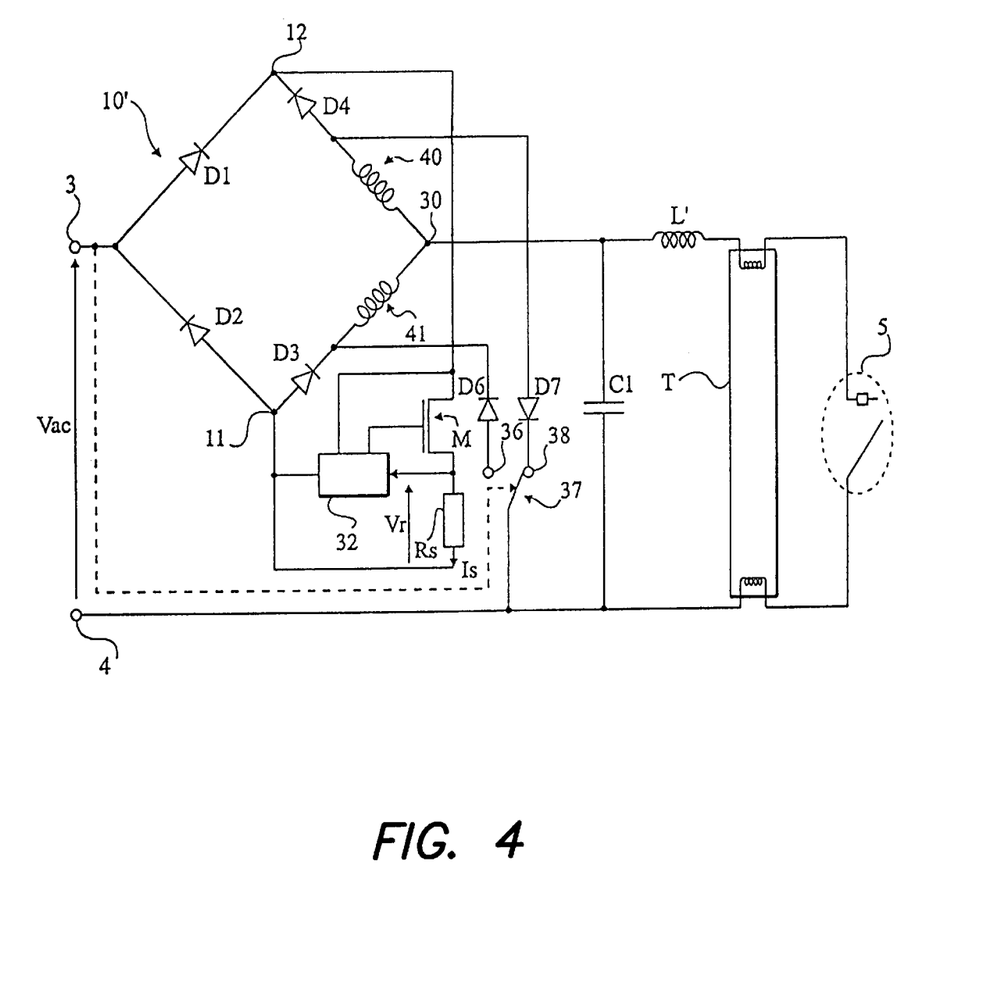
FIG. 4 shows a second embodiment of a fluorescent lamp control circuit according to the present invention.

FIG. 4 shows a second embodiment of a circuit of control of a florescent lamp T according to the present invention.

This embodiment differs from that shown in FIG. 3 in that the function of recovery of the reactive power upon opening of the switch (here, symbolized by a MOS transistor M) is no longer performed by a transformer but by inductances 40, 41.

In the embodiment shown in FIG. 4, two inductances 40 and 41 are respectively connected in series with a diode D4, D3 of rectifying diode bridge 10'. The respective midpoints of the series associations of the diodes, respectively, D3, D4, and of the inductances, respectively, 41, 40, are connected to the respective terminals 36, 38 of inverter 37 via the diodes, respectively D6, D7.

As in the first embodiment, a circuit 32 of control of switch M measures voltage Vr across a resistor Rs connected in series with switch M between terminals 12 and 11 of bridge 10'. The rest of the circuit is not modified with respect to the assembly described in relation with FIG. 3.

During a positive halfwave, the current flows, when switch M is closed, through diode D1, through transistor M, through resistor Rs, through diode D3, and through inductance 41 to charge capacitor C1. Upon opening of the switch, that is, as transistor M is turned off, the current then flows in free wheel mode through inductance 41 and diode D6, inverter 37 being closed on contact 36 during positive halfwaves. The same line of argument applies during negative halfwaves, through inductance 40, diode D4, transistor M, resistor Rs, and diode D2 during periods of switch closing and free-wheeling through inductance 40 and diode D7 when the switch is open, inverter 37 being closed on contact 38 during negative halfwaves.

The choice of the first or second embodiment depends, for example, on the number of inductive elements desired in the circuit and/or on the availability of a high frequency transformer (FIG. 3).

Figure 5A:
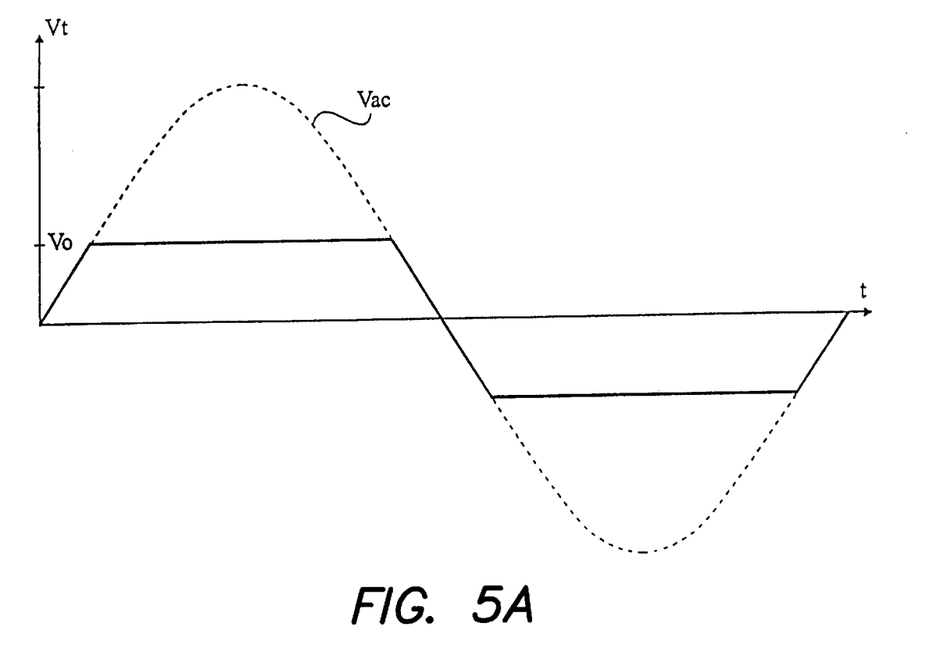
FIGS. 5A to 5D illustrate, in the form of timing diagrams, the operation of a control circuit according to the present invention.
Figure 5B:
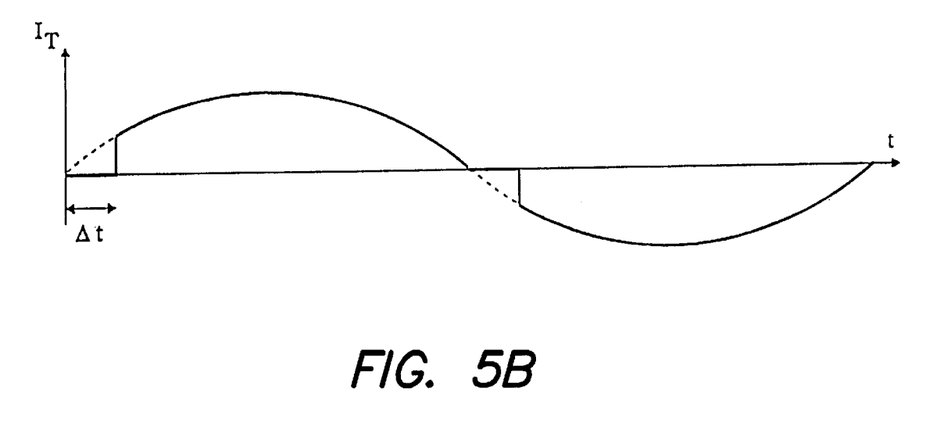
Figure 5C:
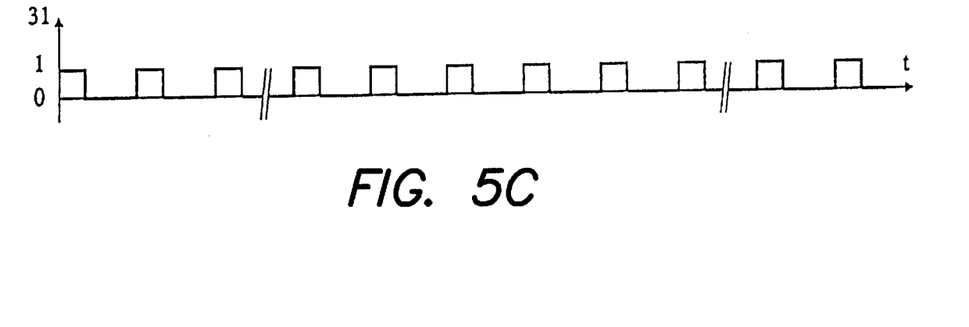
Figure 5D:
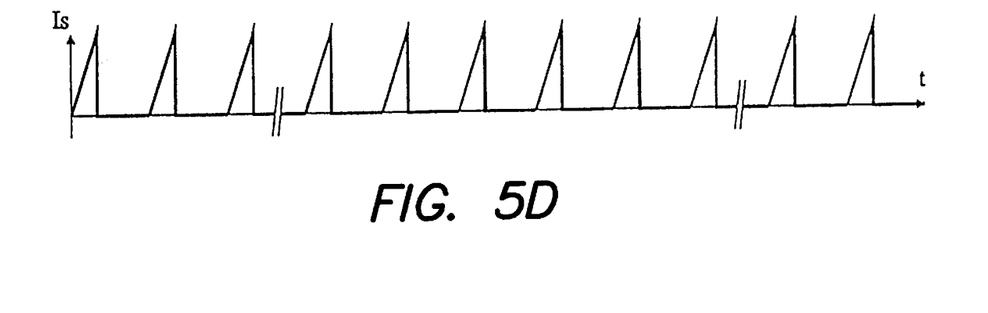

The operation of a control system such as shown in FIGS. 3 and 4 is illustrated by FIGS. 5A to 5D. FIGS. 5A and 5B respectively show the shapes of voltage $V_T$ and of current $I_T$ of the fluorescent lamp. It is assumed that the lamp is in nominal operation, that is, that starter 5 is open. FIGS. 5C and 5D respectively illustrate the closing periods of switch 31 and current Is through measurement resistor Rs. In FIG. 5C, the closing periods of switch 31 have been symbolized by states 1 and the opening periods by states 0.

As illustrated in FIGS. 5C and 5D, switch 31 is controlled at a high frequency, for example, on the order of 100 kHz, and current Is has the shape of a saw-tooth train, the amplitude of which is set by the predetermined threshold, known by circuit 32. Here, the current damping function in resistor Rs, performed by the inductive element (33, FIG. 3—40 or 41, FIG. 4) in series with the switch, which slows down the current slope upon closing of switch 31 or M, can be seen.

As concerns fluorescent lamp T, voltage $V_T$ (FIG. 5A) is limited to a value VO depending on the power of the fluorescent lamp. For example, for a fluorescent lamp of a 20-watt power, which results in a nominal operating voltage on the order of 50 volts RMS, control circuit 32 is then sized to provide a mean current on the order of 400 milliamperes RMS over one period of supply voltage Vac.

As illustrated in FIG. 5B, current $I_T$ in lamp T is at the frequency of a.c. supply Vac by being smoothed by inductance L'. The delay Δt present at each halfwave beginning corresponds to the time taken by voltage Vac to reach the lamp starting voltage (for example, its limiting voltage VO).

An advantage of the present invention, in particular with respect to a conventional circuit such as shown in FIG. 2, is that the control system takes current substantially over the entire halfwave of the a.c. voltage. Accordingly, the present invention considerably reduces the current harmonics due to the current peaks occurring upon each halfwave in a conventional system. In an optimized embodiment, circuit 32 is designed to modulate the current taken from the mains, for example, according to a sine wave in phase with the mains voltage. Such a modulation especially improves the power factor and/or obtains a dimming of the light intensity, as will be seen hereafter.

It should be noted that other means of control of the switched-mode current source so implemented and, in particular, other means of current detection than resistor Rs, may be provided.

Figure 6:
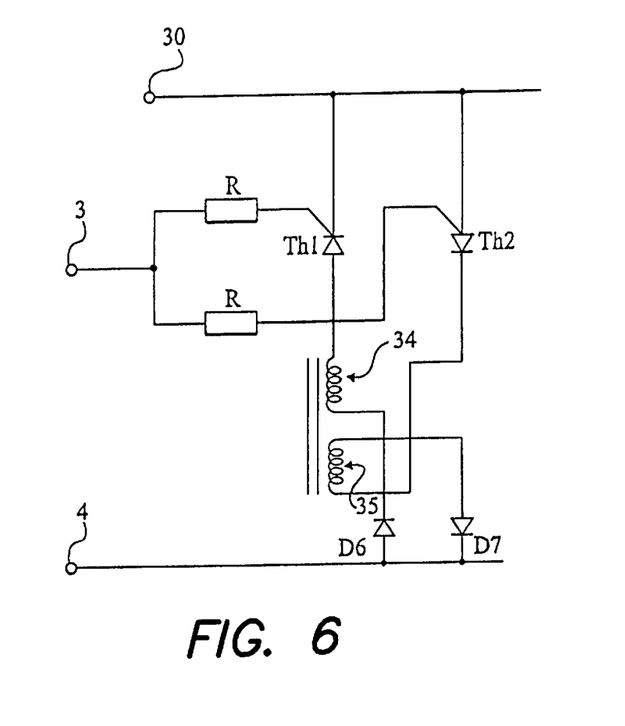
FIG. 6 shows an embodiment of an inverter of a control circuit such as shown in FIGS. 3 and 4.

FIG. 6 shows an embodiment of an inverter 37 controlled at the frequency of the mains a.c. voltage. It should however be noted that other adapted inverter structures may be provided.

In the example shown in FIG. 6, an embodiment of the control system conforming to that of FIG. 3 has been considered. However, the respective positions of diodes D6 and D7 and of windings 34 and 35 with respect to terminals 30 and 4 have been inverted. This has no effect upon the operation since these elements are, anyways, connected in series.

The inverter here is formed by two thyristors Th1, Th2, respectively with a cathode gate and with an anode gate, connected in series with secondary windings 34 and 35. Thus, the cathode of thyristor Th1 is connected to terminal 30 of the bridge (10, FIG. 3) and its anode is connected to a first end of secondary winding 34, a second end of which is connected to terminal 4 via diode D6. The anode of thyristor Th2 is connected to terminal 30 and its cathode is connected to terminal 4 via the series connection of winding 35 and of diode D7. The respective cathode and anode gates of thyristors Th1 and Th2 are connected, each via a resistor R, to a.c. supply terminal 3. Resistors R are of high value (for example, on the order of several hundred kΩ) to limit the current in the gates of thyristors Th1 and Th2.

In positive halfwaves, thyristor Th1 turns on as soon as its gate current is sufficient to trigger it, while thyristor Th2, which is an anode-gate thyristor, cannot be turned on due to the direction of its gate current. Conversely, in negative halfwaves, thyristor Th1 remains off while thyristor Th2 is turned on.

An inverter directly controlled by the mains power supply has thus been implemented.

Of course, inverter 37 at the frequency of the a.c. supply voltage can be implemented by other means than those illustrated as an example in FIG. 6.

An advantage of the present invention is that it replaces a heavy and bulky ferromagnetic limiting circuit (FIG. 1) with an active electronic circuit of low bulk in which all components can be integrated. Indeed, the respective values of the inductive and capacitive elements are perfectly adapted to such an integration. In particular, the inductive elements have values on the order of one mH.

Another advantage of the present invention with respect to the electronic limiter illustrated in FIG. 2 is that it does not require a high value electrolytic capacitor. Indeed, capacitor C1 is, according to the present invention, a capacitor of a value on the order of one hundred nanofarads. The absence of use of an electrolytic capacitor considerably improves the lifetime of the control system.

Another advantage of the present invention is that it requires only a single power transistor operating at high frequency.

To implement a light intensity dimming function by means of a control circuit of the present invention, it is enough to modify the duration of the closing periods of switch 31 between a minimum duration resulting in a minimum power and a maximum duration provided, with a sufficient security margin, to be adapted to the maximum nominal voltage that the fluorescent lamp can withstand.

The practical implementation of a light dimming system is within the abilities of those skilled in the art according to the functional indications given hereabove. For example, a variable resistor (potentiometer) may be introduced in control circuit 32 to modify the measurement voltage used by this circuit and thus modify the duration of the switch closing periods.

Figure 7:
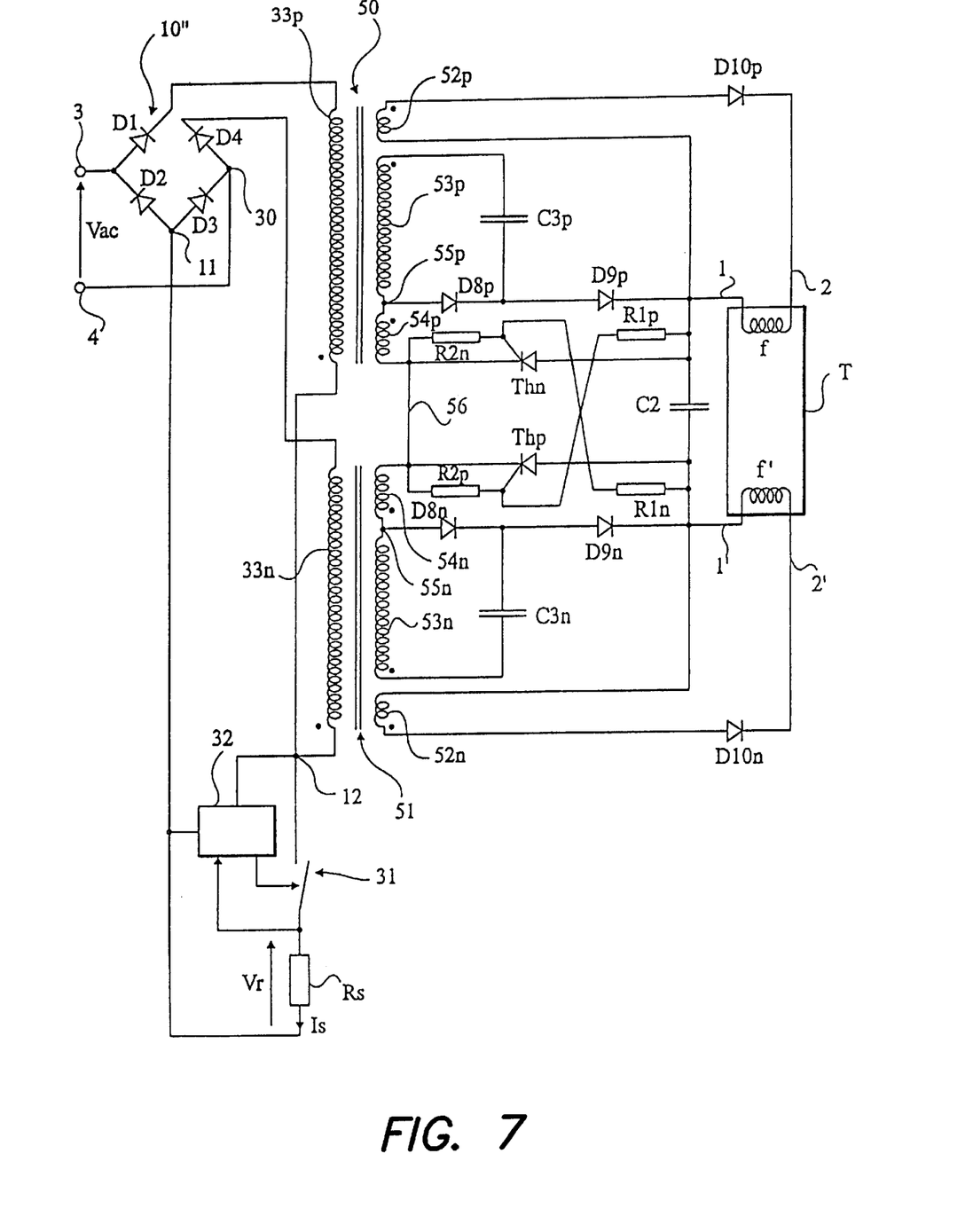
FIG. 7 shows a third embodiment of a fluorescent lamp control circuit according to the present invention, including a starting function.

FIG. 7 shows a third embodiment of a fluorescent lamp control circuit according to the present invention. The embodiment illustrated in FIG. 7 is particularly well adapted to a control circuit in which a power dimming is performed and is meant to replace, not only the conventional current limiter (ballast), but also the starter.

This circuit also provides a controllable switched-mode current source 31, 32, operating at high frequency. This current source is, as in the previous embodiments, for example formed of a switch 31 connected in series with a resistor Rs of measurement of the current between rectified output terminals 12 and 11 of a diode bridge 10". Switch 31 is, as previously, controlled by an electronic circuit 32 based on voltage Vr measured across resistor Rs.

In the embodiment shown in FIG. 7, rectifying bridge 10" includes, in two of its branches, a primary winding of a transformer associated with the halfwaves concerned by the branch. Thus, the anode of diode D1 of bridge 10" is connected to terminal 3 that receives a.c. voltage Vac, while the cathode of diode D1 is connected to a first terminal of a winding 33p of a first transformer 50, the second terminal of which forms positive output terminal 12 of the rectified power supply. Similarly, the anode of diode D4 is connected to the second a.c. supply terminal 30 of bridge 10" (connected to the second terminal 4 of the mains power supply), the cathode of diode D4 being connected to a first terminal of a primary winding 33n of a second transformer 51 associated with the negative halfwaves and the second terminal of which is connected to terminal 12. The rest of the bridge (diodes D2, D3) is similar to a conventional diode bridge such as shown in FIG. 3.

Thus, on the mains side, the assembly of FIG. 7 essentially differs from the assembly of FIG. 3 by the use of two transformers 50, 51 respectively associated with the positive and negative halfwaves of the mains voltage.

According to the embodiment of FIG. 7, the circuit portion which will be described hereafter and which is associated with the secondaries of transformers 50 and 51 is isolated from the mains. Each secondary of transformers 50 and 51 includes three windings, respectively 52p, 53p, 54p, and 52n, 53n, 54n. Windings 53p and 54p (respectively 53n and 54n) have a common node 55p (55n). Winding 52p (52n) has no common node with the other secondary windings. Finally, windings 54p and 54n have a common node 56.

The structure of the circuits, on the secondary side of the transformers, is similar for each transformer respectively associated with the positive or negative halfwaves. The components involved in the positive halfwaves are identified by letter p. The identical components involved in the negative halfwaves have the same reference associated with letter n.

The circuit shown in FIG. 7 enables starting of lamp T by a charge pump operation using windings 53 and 54. This circuit corresponds, for each transformer 50 and 51, to a so-called "flyback" converter.

The midpoint 55p (55n) of windings 53p and 54p (53n and 54n) is connected, via two series diodes D8p, D9p (D8n, D9n), to a first terminal 1 (1') of a filament f (f') of lamp T. Terminal 1 (1') is connected, via winding 52p (52n) mounted in series with a diode D10p (D10n), to the second terminal 2 (2') of the filament involved f (f'). A storage capacitor C2 is connected between terminals 1 and 1'. It should be noted that this capacitor is, according to the present invention, of a value on the order of some ten nanofarads and thus does not need to be electrolytic. The terminal of winding 53p (53n), opposite to node 55p (55n), is connected to the midpoint of the series connection of diodes D8p and D9p (D8n and D9n) via a capacitor C3p (C3n) of low value (on the order of some hundred picofarads).

For each halfwave, the circuit associated with the secondaries of one of the transformers is closed via a thyristor, respectively Thp or Thn, connected between the terminal of capacitor C2 opposite to the terminal of filament 1 (1') involved in the halfwave, and midpoint 56 between windings 54p and 54n. Thus, the anode of thyristor Thn is connected to terminal 1. The anode of thyristor Thp is connected to terminal Th1'. The respective cathodes of thyristors Thn and Thp are connected to node 56. To control thyristors Thp and Thn, their respective gates are connected to the terminal of capacitor C2 opposite to that connecting their anode, via a control resistor, respectively R1n, R1p. The gate of each thyristor is also connected to node 56 via a resistor R2p, R2n forming, with the resistor R1p, R1n involved, a resistive dividing bridge between node 56 and terminal 1, respectively 1', of lamp T.

The operation of the circuit illustrated in FIG. 7 will be described in relation with a positive halfwave. The operation during negative halfwaves can be easily induced from the following description.

It is assumed that lamp T is cold, that is, that it behaves as an open circuit. In this case, upon each closing of switch 31, a current increases linearly in primary winding 33p of transformer 50. The secondary and primary windings are connected so that diode D8p is blocked (non-conducting) when switch 31 is conductive. During this closing period of switch 31, no current flows in the secondaries of transformer 50. The opening of switch 31 causes the inversion of the voltage direction across the secondary windings of transformer 50. Diodes D8p and D9p then become conductive and the power stored in transformer 50 is transmitted to capacitors C3p and C2. The current, in the secondary windings, decreases linearly until it cancels. Switch 31 is closed back and this cycle starts again. During opening periods of switch 31 and during the positive halfwaves, thyristor Thp is on, while thyristor Thn is off. It should be noted that charge pump capacitor C2 stores power and sees the voltage thereacross increase during positive halfwaves as well as during negative halfwaves.

It should be noted that, as previously, as long as the voltage across lamp T has not reached a sufficient value and as long as filaments f and f' are not hot enough, the lamp behaves as an open circuit. During positive halfwaves and during periods of opening of switch 31, a current flows through winding 52p in diode D10p to heat up filament f. When the voltage across capacitor C2 becomes sufficient, lamp T starts. Once the lamp is started, the voltage across winding 52p decreases. Accordingly, the heating current of filament f decreases without, however, stopping.

As long as the lamp has not been started, the voltages of the secondary windings of the transformers depend on the respective number of spirals of the windings. Attention will be paid to having a higher voltage for winding 53p than for winding 54p, and to having the lowest voltage for winding 52p. Further, winding 54p will be provided to be made with a wire of sufficient cross-section, since this winding has to be designed to carry the nominal current of lamp T once started.

It should be noted that, during the preheating of lamp T, the voltages across the secondary windings are higher than in the nominal state. This is not disturbing since, as long as it has not been started, the lamp takes no current. As a specific example of implementation, winding 52p of preheating of filament f has a voltage from 8 to 10 volts as long as the lamp has not been started. This voltage drops to 4 volts once the lamp is started. Winding 54p has a voltage of some hundred volts. Winding 53p has the highest voltage among the secondary windings, for example, on the order of 500 to 1000 volts, as long as the lamp has not been started.

An advantage of the embodiment illustrated in relation with FIG. 7 is that it is particularly well adapted to a light dimming function. Indeed, due to the presence of windings 52p, 52n of pre-heating of filaments f and f', any flickering of lamp T by its cooling down in case of a decrease of the light intensity, and thus of a decrease in the power transmitted to the secondaries of the transformers, is avoided. With a conventional starting circuit which operates according to a thermal principle, the starting circuit causes untimely and random failures of the lamp.

It should be noted that transformers 50 and 51 which have been shown in FIG. 7 with a common node 12 of primary windings 33p and 33n are particularly well adapted to the implementation of the circuit according to the present invention by means of an integrable transformer. It could however be provided, as an alternative, to associate each primary of transformers 50 and 51 to the anode of diodes D1 and D4, respectively. Node 12 then becomes the anodes of diodes D1 and D4 again, as in the preceding drawings. The circuit operation is not modified for all this with respect to that described in relation with FIG. 7.

It should be noted that the embodiment illustrated by FIG. 7 has the same advantages as the preceding embodiments as concerns the absence of use of a high inductance and the absence of use of an electrolytic capacitor. Further, the circuit of FIG. 7 corresponds to a complete electronic "ballast" (starting, preheating, dimming possibility). Further, this circuit applies particularly well to the case where lamp T is desired to be isolated from the mains.

Of course, the present invention is likely to have various alterations, modifications, and improvements which will readily occur to those skilled in the art. In particular, the respective sizings of the different components used will be adapted according to the power of the fluorescent lamp. Further, the assemblies described hereabove as an example can be modified provided that they respect the functional characteristic of creating a high frequency switched-mode current source while providing a low frequency a.c. current to the fluorescent lamp.

Further, although, in the foregoing description of FIGS. 3 and 4, the connection, in series with inductance L', of a fluorescent lamp T in parallel with starting circuit 5 has been considered, the control circuit of the present invention can also be used to connect, in series with inductance L', a fluorescent lamp already associated with a conventional electronic control circuit (FIG. 2). In other words, the embodiments of FIGS. 3 and 4 can be implemented as the complement of a conventional electronic "ballast", in particular, if the latter uses bipolar transistors and an element of control transformer type. The present invention then offers the advantage of providing a light dimming function by means of a simple circuit of low bulk.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit adapted to control a fluorescent lamp, including:

a bridge for rectifying a low frequency A.C. supply voltage, at least one switch, connected between two rectified voltage terminals of the bridge, constituting a controllable switched-mode current source operating at high frequency, at least one inductive element that receives energy if the switch is closed, and provides energy if the switch is open; and an output coupled to the at least one inductive element, to provide an A.C. output current having a low frequency corresponding to the low frequency of the supply voltage, the A.C. output current including energy provided by the at least one inductive element.

2. The control circuit of claim 1, wherein the switch is connected in series with a measurement resistor between two rectified output terminals of the bridge, the switch being controlled by a circuit based on a measurement of the current in the resistor.

3. The control circuit of claim 1, wherein the switched-mode current source is supplied between the two rectified output terminals of the bridge.

4. The control circuit of claim 1, including means for varying the light intensity of the fluorescent lamp.

5. The control circuit of claim 1, wherein the lamp is connected between a first terminal of the low frequency a.c. power supply and a first a.c. input terminal of the bridge, the other a.c. input terminal of which is connected to a second terminal of the a.c. power supply.

6. The control circuit of claim 5, wherein a capacitor of low value is connected in parallel with a series connection of an inductance of low value and the lamp.

7. The control circuit of claim 5, wherein the bridge comprises, between its first a.c. input terminal and each of the rectified output terminals, an inductive element.

8. The control circuit of claim 5, comprising only one inductive element connected in series with the switch between the rectifying output terminals of the bridge.

9. The control circuit of claim 8, wherein said means include an inverter controlled at the frequency of the A.C. supply voltage and capable of operating an inductive element in free wheel mode during the opening periods of the switch.

10. The control circuit of claim 1, wherein a first a.c. input terminal of the bridge is directly connected to a first terminal of the low frequency supply source, the other a.c. input terminal of the bridge being directly connected to a second terminal of the a.c. supply source.

11. The control circuit of claim 10, wherein the bridge comprises:

a first inductive element in series with a first diode of the bridge between the second terminal of the a.c. power supply and a first rectifying output terminal; and a second inductive element in series with a second diode between the first a.c. input terminal and the first rectifying output terminal.

12. The control circuit of claim 11, wherein the first inductive elements form respective primary windings of two transformers for isolating the lamp with respect to the a.c. supply voltage.

13. The control circuit of claim 12, wherein each transformer includes a first secondary winding for heating a filament of the lamp.

14. The control circuit of claim 13, wherein each transformer further includes a second secondary winding for starting the lamp by forming, with a capacitor connected between first terminals of the filaments, and charge pump circuit.

15. The control circuit of claim 14, wherein each transformer includes a third secondary winding for supplying the lamp once started.

* * * * *